(12) United States Patent
Morita

(10) Patent No.: US 9,900,449 B2
(45) Date of Patent: Feb. 20, 2018

(54) IMAGE READING SYSTEM, IMAGE READING APPARATUS, INFORMATION PROCESSING APPARATUS, METHOD FOR CONTROLLING THEM, AND STORAGE MEDIUM

(71) Applicant: CANON KABUSHIKI KAISHA, Tokyo (JP)

(72) Inventor: Naoki Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/521,665

(22) Filed: Oct. 23, 2014

(65) Prior Publication Data

US 2015/0146232 A1 May 28, 2015

(30) Foreign Application Priority Data

Nov. 25, 2013 (JP) .................................. 2013-243342

(51) Int. Cl.
*H04N 1/00* (2006.01)
*H04N 1/44* (2006.01)

(52) U.S. Cl.
CPC ..... *H04N 1/00217* (2013.01); *H04N 1/00225* (2013.01); *H04N 1/4433* (2013.01); *H04N 2201/0018* (2013.01); *H04N 2201/0075* (2013.01)

(58) Field of Classification Search
CPC ........... H04N 1/00854; H04N 1/00217; H04N 1/00244; H04N 1/00875; H04N 1/00408; H04N 2201/0094; H04N 2201/0081; H04N 1/00225; H04N 1/4433; H04N 2201/0018; H04N 2201/0075

See application file for complete search history.

(56) References Cited

U.S. PATENT DOCUMENTS

| 2013/0141749 | A1* | 6/2013 | Chiba | H04N 1/4406 358/1.14 |
| 2014/0185088 | A1* | 7/2014 | Lee | H04N 1/00342 358/1.15 |
| 2015/0043021 | A1* | 2/2015 | Ikeda | H04N 1/32561 358/1.13 |
| 2015/0116760 | A1* | 4/2015 | Kim | H04N 1/00503 358/1.15 |
| 2015/0153975 | A1* | 6/2015 | Mori | G06F 3/1206 358/1.14 |

FOREIGN PATENT DOCUMENTS

JP          2013-070311          4/2013

* cited by examiner

*Primary Examiner* — Iriana Cruz
(74) *Attorney, Agent, or Firm* — Fitzpatrick, Cella, Harper & Scinto

(57) ABSTRACT

In the present image reading system, an information processing apparatus notifies any image reading apparatus on a network of connection information, and permits transmission of image data only in a case where the image reading apparatus notified of the connection information accesses the information processing apparatus. The image reading apparatus transmits image data that is read from an original, to a transmission destination conforming to the connection information is notified by the information processing apparatus.

9 Claims, 9 Drawing Sheets

F I G. 1
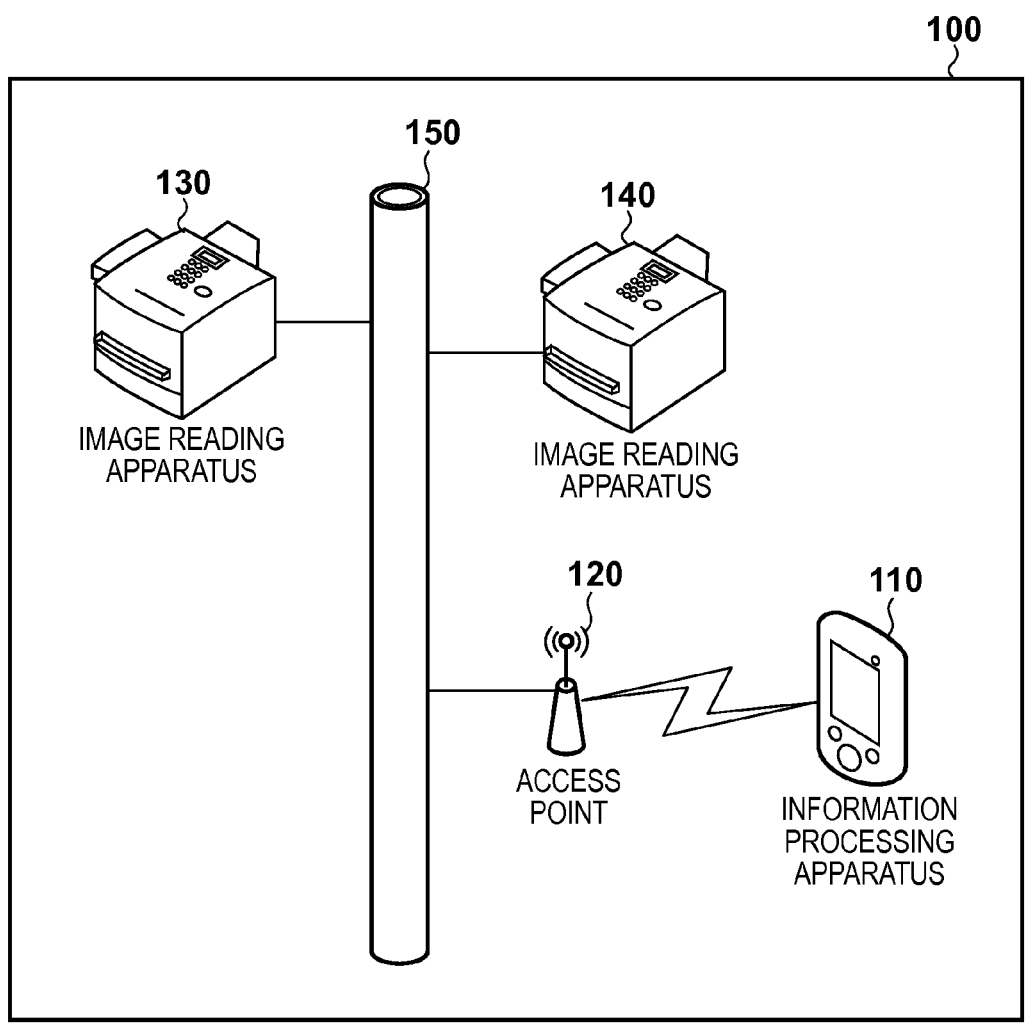

FIG. 7
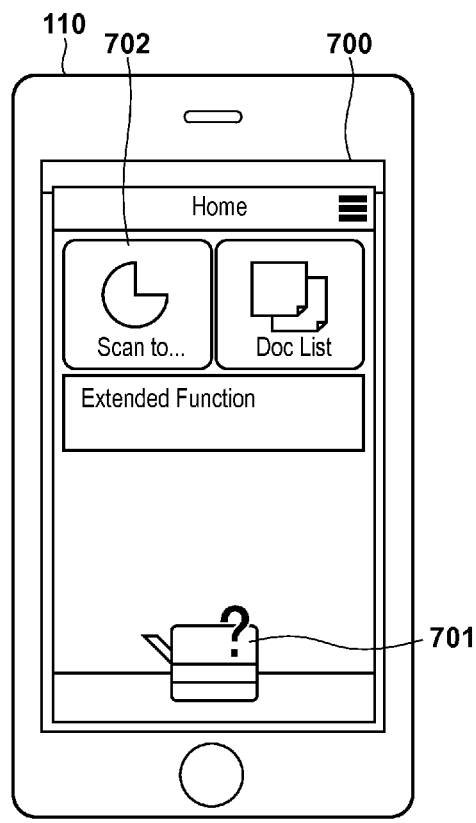
FIG. 8
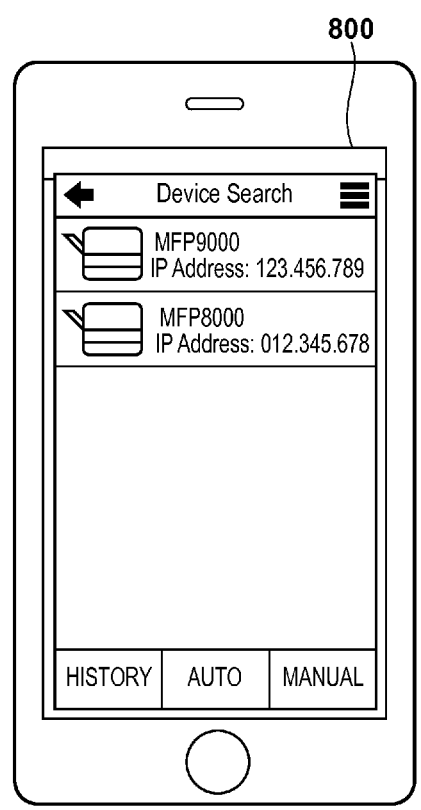
FIG. 9
| APPARATUS NAME | IP ADDRESS | MAC ADDRESS |
|---|---|---|
| MFP9000 | 123.456.789.000 | 12-34-56-78-9A-BC |

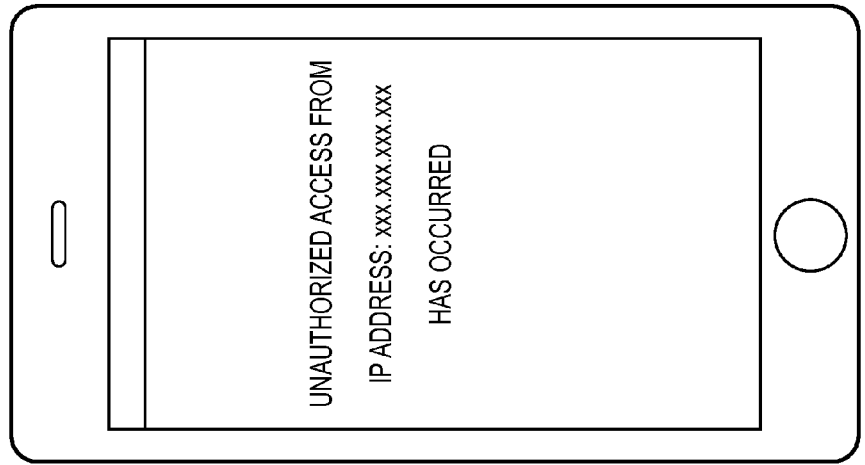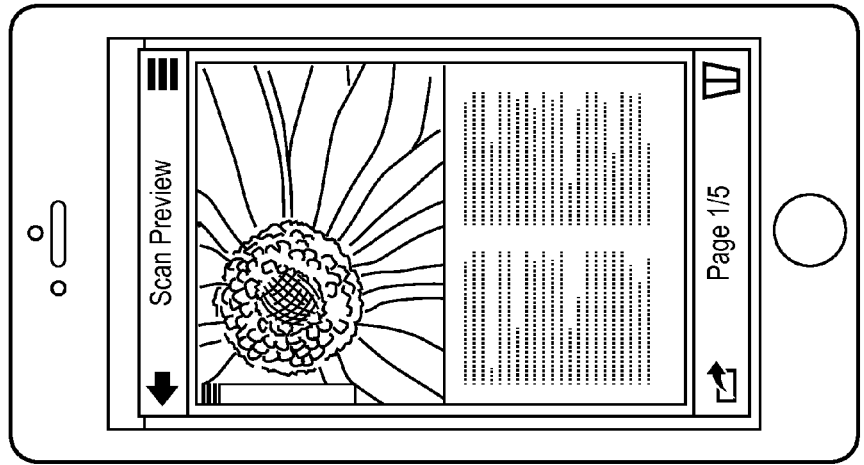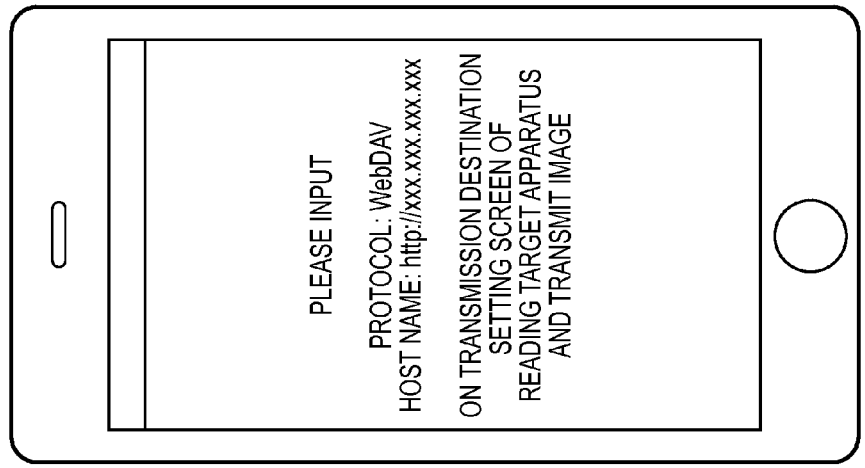

IMAGE READING SYSTEM, IMAGE READING APPARATUS, INFORMATION PROCESSING APPARATUS, METHOD FOR CONTROLLING THEM, AND STORAGE MEDIUM

BACKGROUND OF THE INVENTION

Field of the Invention

The present invention relates to an image reading system, an image reading apparatus, an information processing apparatus, a method for controlling them, and a storage medium.

Description of the Related Art

Image reading systems are known that transmit an image read by an image reading apparatus, such as a multi-function printer, to an information processing apparatus, such as a PC or a mobile terminal, which can communicate with the image reading apparatus. In particular, a method in which, in the image reading system, a user performs operations related to image reading and transmission on the image reading apparatus side is called PushScan. Methods for designating a transmission destination of an image in the image reading system includes a method in which the user inputs an IP address of a transmission destination. However, with this method, the IP address of a transmission destination changes in an environment using DHCP, and accordingly the user needs to recheck the IP address of the transmission destination at the time of each transmission. Furthermore, there is also a possibility that the user fails to input the IP address due to a typing error or the like and transmits an image to an incorrect transmission destination.

In order to solve the aforementioned problem, Japanese Patent Laid-Open No. 2013-070311 proposes a technique for having a user select an information processing apparatus and setting the IP address of this information processing apparatus as a transmission destination, thereby setting the transmission destination without making the user aware of the IP address. Meanwhile, a technique called IP filtering for rejecting access from an IP address other than a specific IP address is known as a technique for preventing unauthorized access via a network.

However, the above conventional technique has the following problem. For example, in the image reading system in the above conventional technique, the information processing apparatus receives an image, and is therefore in a state of being able to be accessed from an external apparatus. Accordingly, the information processing apparatus may possibly be subjected to unauthorized access that is made intentionally or due to mistyping of the transmission destination, from an image reading apparatus other than the image reading apparatus that the user operates. Furthermore, in a case of using IP filtering in order to prevent unauthorized access, an operation of setting IP filtering needs to be additionally performed in a series of user operations for performing image reading.

SUMMARY OF THE INVENTION

The present invention enables realization of a mechanism that prevents unauthorized access to an information processing apparatus while suppressing a workload on a user in a series of image reading operations.

One aspect of the present invention provides an image reading system including an information processing apparatus and a plurality of image reading apparatuses for reading an image from an original, the information processing apparatus comprising: a notification unit configured to notify any of the image reading apparatuses connected via a network, of connection information for accessing the information processing apparatus; a determination unit configured to determine, when access is made from an external apparatus, whether or not the external apparatus is the image reading apparatus notified of the connection information by the notification unit; and a reception unit configured to reject the access from the external apparatus if, as a result of the determination by the determination unit, the external apparatus is not the image reading apparatus notified of the connection information by the notification unit, and permit the access from the external apparatus and receive image data therefrom if the external apparatus is the image reading apparatus notified of the connection information by the notification unit, and the image reading apparatuses each comprising: a storage unit configured to store the connection information notified by the notification unit, as a transmission destination among setting items related to image reading; a setting unit configured to configure a setting related to image reading, using the information stored in the storage unit; and a transmission unit configured to transmit, upon receiving an image reading instruction, the image data that is read from the original to the transmission destination that is configured in the setting related to image reading.

Another aspect of the present invention provides an information processing apparatus connected, via a network, to a plurality of image reading apparatuses for reading an image from an original, the information processing apparatus comprising: a notification unit configured to notify any of the image reading apparatuses of connection information for accessing the information processing apparatus; a determination unit configured to determine, when access is made from an external apparatus, whether or not the external apparatus is the image reading apparatus notified of the connection information by the notification unit; and a reception unit configured to reject the access from the external apparatus if, as a result of the determination by the determination unit, the external apparatus is not the image reading apparatus notified of the connection information by the notification unit, and permit the access from the external apparatus and receive image data therefrom if the external apparatus is the image reading apparatus notified of the connection information by the notification unit.

Still another aspect of the present invention provides an image reading apparatus connected to an information processing apparatus via a network, the image reading apparatus comprising: a storage unit configured to store connection information that is for accessing the information processing apparatus and of which the information processing apparatus notifies the image reading apparatus, as a transmission destination among setting items related to image reading; a setting unit configured to configure a setting related to image reading, using the information stored in the storage unit; and a transmission unit configured to transmit, upon receiving an image reading instruction, the image data that is read from the original to the transmission destination that is configured in the setting related to image reading.

Yet still another aspect of the present invention provides a method for controlling an image reading system including an information processing apparatus and a plurality of image reading apparatuses for reading an image from an original, the method comprising: in the information processing apparatus, notifying any of the image reading apparatuses connected via a network, of connection information for accessing the information processing apparatus; determining, when access is made from an external apparatus, whether or not the external apparatus is the image reading apparatus notified of the connection information in the notifying; and rejecting the access from the external apparatus if, as a result of the determining, the external apparatus is not the image reading apparatus notified of the connection information in the notifying, and permitting the access from the external apparatus and receiving image data therefrom if the external apparatus is the image reading apparatus notified of the connection information in the notifying, and in the image reading apparatuses, storing the connection information notified in the notifying, as a transmission destination among setting items related to image reading; configuring a setting related to image reading, using the information stored in the storing; and transmitting, upon receiving an image reading instruction, the image data that is read from the original to the transmission destination that is configured in the setting related to image reading.

Still yet another aspect of the present invention provides a method for controlling an information processing apparatus connected, via a network, to a plurality of image reading apparatuses for reading an image from an original, the method comprising: notifying any of the image reading apparatuses connected via a network, of connection information for accessing the information processing apparatus; determining, when access is made from an external apparatus, whether or not the external apparatus is the image reading apparatus notified of the connection information in the notifying; and rejecting the access from the external apparatus if, as a result of the determining, the external apparatus is not the image reading apparatus notified of the connection information in the notifying, and permitting the access from the external apparatus and receiving image data therefrom if the external apparatus is the image reading apparatus notified of the connection information in the notifying.

Yet still another aspect of the present invention provides a method for controlling an image reading apparatus connected to an information processing apparatus via a network, the method comprising: storing connection information that is for accessing the information processing apparatus and of which the information processing apparatus notifies the image reading apparatus, as a transmission destination among setting items related to image reading; configuring a setting related to image reading, using the information stored in the storing; and transmitting, upon receiving an image reading instruction, the image data that is read from the original to the transmission destination that is configured in the setting related to image reading.

Still yet another aspect of the present invention provides a computer-readable program for causing a computer to function as the information processing apparatus.

Yet still another aspect of the present invention provides a computer-readable program for causing a computer to function as the image reading apparatus.

Further features of the present invention will be apparent from the following description of exemplary embodiments with reference to the attached drawings.

BRIEF DESCRIPTION OF THE DRAWINGS

FIG. 1 is a schematic diagram showing an image reading system 100 according to an embodiment.

FIG. 7 is a diagram showing an initial screen of an application 400 of the information processing apparatus 110 according to an embodiment.

FIG. 8 is a diagram showing a search result screen of the application 400 of the information processing apparatus 110 according to an embodiment.

FIG. 9 is a diagram showing exemplary information related to a reading target according to an embodiment.

FIG. 10 is a diagram showing an example of an image transmission destination notification screen of the application 400 of the information processing apparatus 110 according to an embodiment.

FIG. 11 is a diagram showing an example of a received image display screen of the application 400 of the information processing apparatus 110 according to an embodiment.

FIG. 12 is a diagram showing an example of an unauthorized access occurrence notification screen of the application 400 of the information processing apparatus 110 according to an embodiment.

DESCRIPTION OF THE EMBODIMENTS

Figure 2:
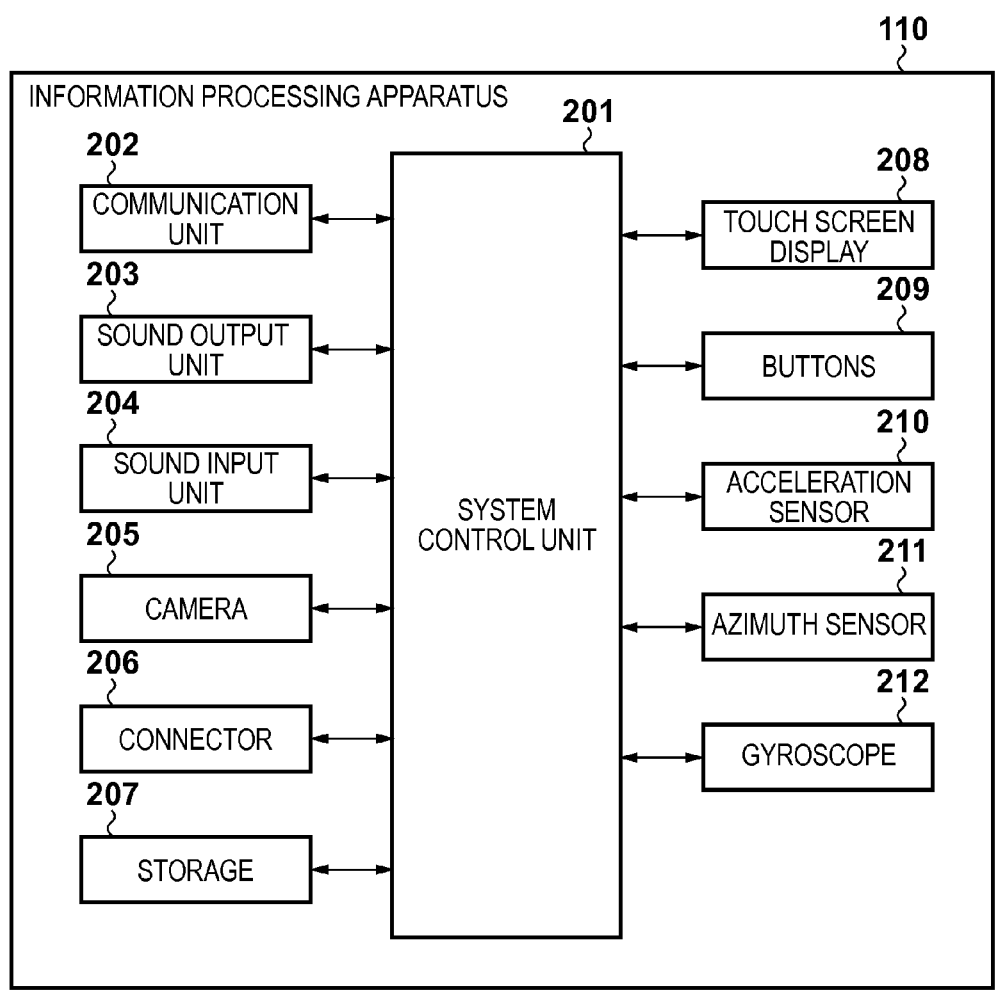
FIG. 2 is a block diagram showing a hardware configuration of an information processing apparatus 110 according to an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

System Configuration

Firstly, an image reading system according to an embodiment of the present invention will be described with reference to FIG. 1. Reference numeral 100 in FIG. 1 denotes an image reading system, which is constituted by an information processing apparatus 110, an access point 120, and image reading apparatuses 130 and 140.

It is assumed in the present embodiment that the information processing apparatus 110 is a mobile terminal such as a smartphone, and the information processing apparatus 110 is connected to a network 150 via the access point 120. The image reading apparatuses 130 and 140 are also connected to the network 150, and the information processing apparatus 110 and the image reading apparatuses 130 and 140 can communicate with each other via the network. The image reading apparatuses 130 and 140 may be connected to the network 150 via the access point 120. Note that, in the present invention, the system configuration including the type and the number of information processing apparatuses and image reading apparatuses is not limited to the configuration shown in the drawings, and may be changed as appropriate within the scope that does not depart from the gist of the present invention.

Configuration of Information Processing Apparatus

Next, a hardware configuration of the information processing apparatus 110 will be described with reference to FIG. 2. The information processing apparatus 110 includes a system control unit 201, a communication unit 202, a sound output unit 203, a sound input unit 204, a camera 205, a connector 206, and a storage 207. Furthermore, the information processing apparatus 110 includes a touch screen display 208, buttons 209, an acceleration sensor 210, an azimuth sensor 211, and a gyroscope 212. The configuration of the information processing apparatus 110 shown in FIG. 2 is an example, and may be changed as appropriate within the scope that does not depart from the gist of the present invention.

The touch screen display 208 displays graphics such as characters, images, and diagrams, and detects a user operation (tapping, flicking, or the like using a finger or a stylus pen) that is performed on the screen. The buttons 209 are hardware buttons and operated by a user, and include a plurality of buttons. The system control unit 201 detects operations (clicking, double clicking, pushing, etc.) on the buttons, in cooperation with the buttons 209. For example, the buttons include a home button, a power on/off button, a volume button, and the like.

The communication unit 202 is a module for performing communication. A communication format used by the communication unit 202 is a wireless communication standard. For example, wireless communication standards include mobile wireless communication standards such as 2G, 3G, and 4G. Other wireless communication standards include WIFI (IEEE802.11), WiMAX, NFC, and the like. The communication unit 202 may support one or more of the aforementioned communication standards.

The sound output unit 203 outputs, as sound, a sound signal transmitted from the system control unit 201. The sound input unit 204 converts voice of a user or the like into a sound signal and transmits it to the system control unit 201.

The storage 207 stores programs and data. For example, it stores at least one of a control program, an application, and setting data. The storage 207 is also used as a work area for temporarily storing a result of processing of the system control unit 201. The storage 207 may include any storage device such as a semiconductor storage device or a magnetic storage device. The storage 207 may also include multiple types of storage devices. The storage 207 may also be a combination of a portable storage medium, such as a memory card, and a storage medium reader. The programs stored in the storage 207 include an application executed on the foreground or background, and a control program for supporting operations of the application.

The application causes the touch screen display 208 to display a predetermined screen, and causes the system control unit 201 to execute processing in accordance with a gesture detected by the touch screen display 208, for example. The control program is an OS, for example. The application and the control program are installed in the storage 207 via wireless communication performed by the communication unit 202. The control program provides functions related to various kinds of control for operating the information processing apparatus 110. The control program realizes a call by controlling the communication unit 202, the sound output unit 203, the sound input unit 204, and the like, for example.

The system control unit 201 is a CPU (Central Processing Unit), for example. The system control unit 201 may be an integrated circuit, such as a SoC (System-on-a-chip),) which integrates other constituent elements such as the communication unit 202. The system control unit 201 comprehensively controls operations of the information processing apparatus 110 and realizes various functions. Specifically, the system control unit 201 executes commands included in a program stored in the storage 207 while referencing the data stored in the storage 207 as necessary. The system control unit 201 realizes various functions by controlling the touch screen display 208, the communication unit 202, and the like. The system control unit 201 changes control in accordance with a result of detection by various detection units such as the touch screen display 208, the buttons 209, and the acceleration sensor 210, in some cases.

The camera 205 is a rear-facing camera for shooting an object. The connector 206 is a terminal to which another device is connected. The connector 206 may be a general-purpose terminal such as a USB (Universal Serial Bus), an HDMI (High-Definition Multimedia Interface), Light Peak (Thunderbolt), or an earphone-microphone connector. The connector 206 may also be an exclusively designed terminal such as a Dock connector. Devices connected to the connector 206 include an external storage, a speaker, and a communication device, for example.

The acceleration sensor 210 detects the direction and magnitude of acceleration exerted on the information processing apparatus 110. The azimuth sensor 211 detects an orientation of geomagnetism. The gyroscope 212 detects a rotation of the information processing apparatus 110. Results of detection by the acceleration sensor 210, the azimuth sensor 211, and the gyroscope 212 are used in combination in order to detect a change of the position and posture of the information processing apparatus 110.

Configuration of Image Reading Apparatus

Figure 3:
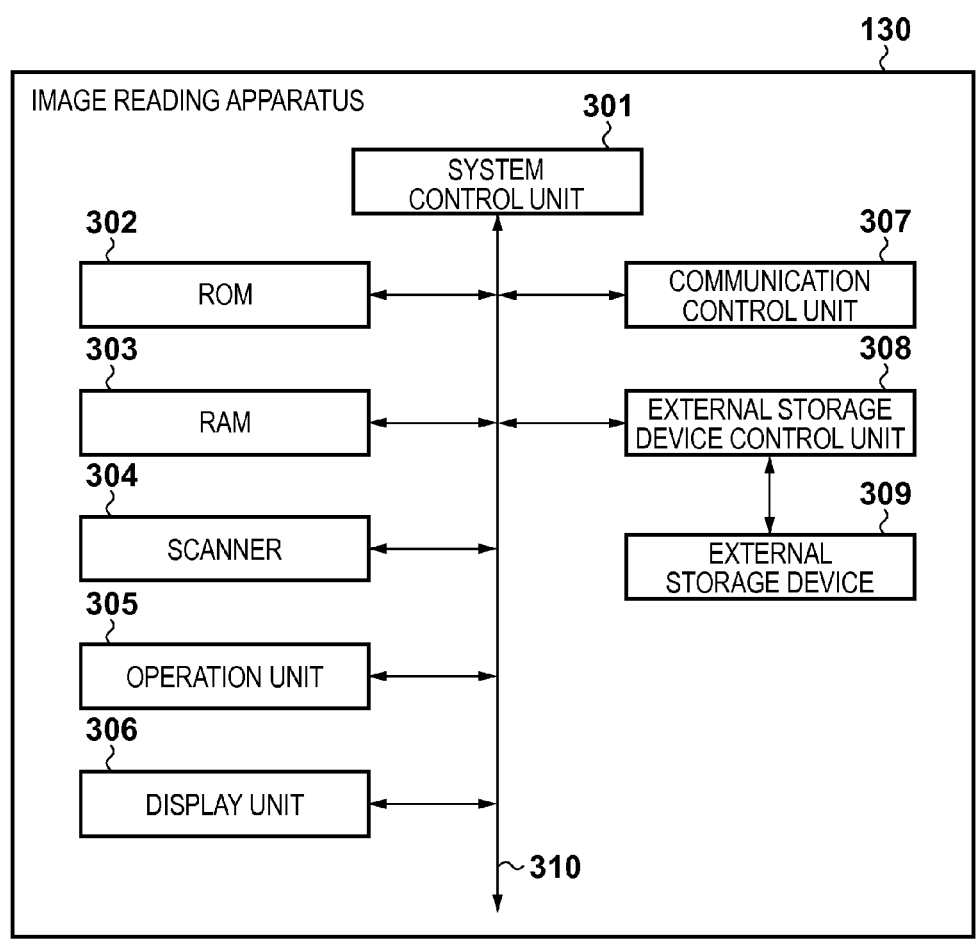
FIG. 3 is a block diagram showing a hardware configuration of an image reading apparatus 130 according to an embodiment.

Next, an exemplary hardware configuration of the image reading apparatus 130 will be described with reference to FIG. 3. Note that the image reading apparatus 140 has the same configuration. The image reading apparatus 130 includes a system control unit 301, a ROM 302, a RAM 303, a scanner 304, an operation unit 305, a display unit 306, a communication control unit 307, an external storage device control unit 308, an external storage device 309, and a system bus 310. The configuration of the image reading apparatus 130 shown in FIG. 3 is an example, and may be changed as appropriate within the scope that does not depart from the gist of the present invention.

The system control unit 301 is a processor such as a CPU, and has a function of executing various kinds of processing performed by the image reading apparatus 130. The ROM 302 is a nonvolatile storage device, and stores various control programs and initial set values of the image reading apparatus 130. In the present embodiment, the software held by the image reading apparatus 130 is recorded in the ROM 302, and is stored in the RAM 303 and executed when necessary. The RAM 303 is a volatile storage device and is used as a work area for various kinds of processing performed by the image reading apparatus 130. In the present embodiment, the software held by the image reading apparatus 130 is stored in the RAM 303 and executed.

The scanner 304 is an image reading unit for reading an image printed on paper. In many cases, an automatic document feeder (not shown) is optionally installed in the scanner 304, and the scanner 304 can automatically read multiple sheets of original. In the present embodiment, in some cases, the external storage device 309 is used as a location for temporarily storing the image read by the scanner 304.

The operation unit 305 is an input device such as buttons, and an input state thereof is constantly monitored by the system control unit 301. The display unit 306 is a display device such as an LED or an LCD, and performs display in accordance with the control by the system control unit 301. Accordingly, the system control unit 301 is an exemplary display control unit.

The communication control unit 307 includes a connector such as a USB connector or a network connector, and a control device thereof, and controls input and output to/from an external apparatus, in accordance with the control by the system control unit 301. The external storage device control unit 308 performs control of input and output to/from the external storage device 309, such as a hard disk, and the like.

The system bus 310 is a bus within the image reading apparatus 130 in which the aforementioned system control unit 301, ROM 302, RAM 303, scanner 304, operation unit 305, display unit 306, communication control unit 307, and external storage device control unit 308 are arranged. The components can mutually exchange data via the system bus 310.

Software Configuration of Image Reading System

Figure 4:
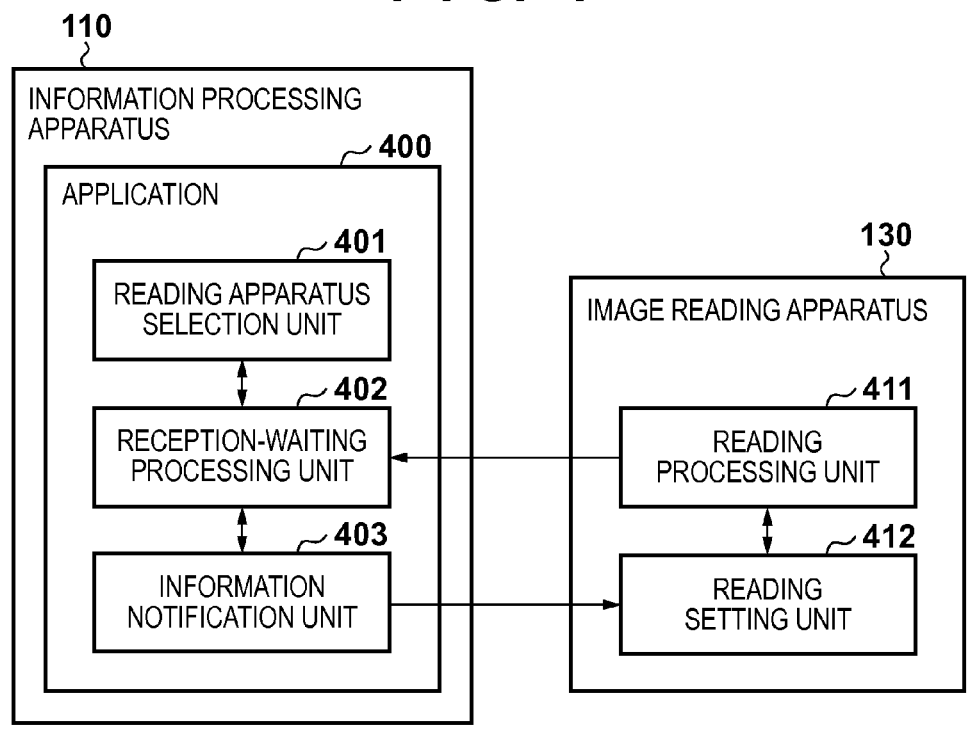
FIG. 4 is a block diagram showing a software configuration of the image reading system 100 according to an embodiment.

Next, an exemplary software configuration of the image reading system 100 will be described with reference to FIG. 4. The information processing apparatus 110 has the application 400. The application 400 is stored in the storage 207, and is executed by the system control unit 201 when necessary. The application 400 has a reading apparatus selection unit 401, a reception-waiting processing unit 402, and an information notification unit 403.

The reading apparatus selection unit 401 searches for image reading apparatuses on the network, displays them on the touch screen display 208, and determines that an image reading apparatus selected from among them by the user is a "reading target" apparatus. The search method may be automatic search using a unique protocol or a general protocol such as SNTP, or may be search conducted by manually inputting an IP address. The reading apparatus selection unit 401 then stores, in the storage 207, information related to the reading target apparatus. In the present embodiment, for example, a name, an IP address, and a Mac address of the apparatus are stored as the information (network information) related to the reading target apparatus.

The reception-waiting processing unit 402 permits access to the information processing apparatus 110 from an external apparatus, in accordance with a user instruction, and causes the application to transition to an image reception-waiting state. In the present embodiment, the reception-waiting processing unit 402 uses WebDAV as a protocol for receiving an image. WebDAV is a server/client communication protocol aimed for file management on a Web server. A transition to the image reception-waiting state in the present embodiment means that the reception-waiting processing unit 402 operates as a WebDAV server, and indicates reception of transmission from a WebDAV client.

The reception-waiting processing unit 402 also has an IP address filtering function, and can reject access from any IP address. Furthermore, after receiving a user instruction and before transitioning to the image reception-waiting state, the reception-waiting processing unit 402 checks whether the IP address has changed, based on the Mac address of the reading target, and if changed, the reception-waiting processing unit 402 updates the stored information using the changed IP address. Note that the method for checking an IP address using a Mac address may be a general means such as RARP, or may be a unique protocol. Furthermore, after receiving a user instruction and before transitioning to the image reception-waiting state, the reception-waiting processing unit 402 gives the information notification unit 403 an instruction to notify the image reading apparatus 130 of information (hereinafter referred to as notification information (connection information)) related to image reading and transmission.

The information notification unit 403 transmits, using the communication unit 202, the notification information to the reading target image reading apparatus 130, via the network 150. In the present embodiment, the information notification unit 403 transmits, as the notification information, the IP address of the information processing apparatus 110.

The image reading apparatus 130 has a reading processing unit 411 and a reading setting unit 412. The reading processing unit 411 reads an image using the scanner 304 in accordance with set content of the reading setting unit 412, and transmits the read image to a transmission destination, using the communication control unit 307. In the present embodiment, the reading processing unit 411 uses WebDAV as a communication protocol. The reading processing unit 411, which serves as a WebDAV client, transmits an image to the information processing apparatus 110, which serves as a WebDAV server.

The reading setting unit 412 displays, on the display unit 306, a setting screen related to various settings (image file format etc.) necessary for image reading and transmission destination settings. The user can give an instruction to execute image reading, after inputting setting items through the operation unit 305. The reading setting unit 412 stores, in the RAM 303 or the external storage device 309, the notification information transmitted from the information notification unit 403, and automatically inputs the information of which the reading setting unit 412 is notified to the setting items and displays the information, when displaying a setting UI on the display unit 306. In the present embodiment, since the information notification unit 403 transmits the IP address of the information processing apparatus 110 as the notification information, the reading setting unit 412 automatically inputs the IP address of the information processing apparatus 110 to a transmission destination setting item of the read image.

Selection Processing

Figure 5:
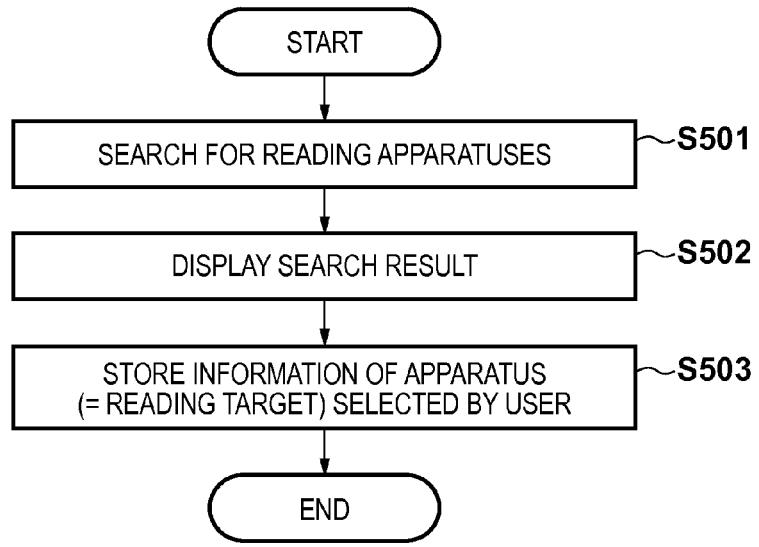
FIG. 5 is a flowchart showing processing by which the information processing apparatus 110 according to an embodiment selects an image reading apparatus.

Next, a procedure of processing performed when the information processing apparatus 110 selects an image reading apparatus in the present embodiment will be described with reference to FIG. 5. The processing described below is realized by the system control unit 201 executing a control program or the like stored in the storage 207. This processing is started when the user taps an icon 701 for selecting a reading target apparatus from an initial screen 700 of the application 400 of the information processing apparatus 110 shown in FIG. 7, or at the time of transition to the image reception-waiting state, in a state where a reading target apparatus is not selected. The details of the processing started at the time of transition to the image reception-waiting state will be described later using FIG. 6.

In step S501, the reading apparatus selection unit 401 searches for image reading apparatuses existing on the network. The search method may be automatic search or manual search, as mentioned in the description of the reading apparatus selection unit 401 in FIG. 4. After the search ends, the processing proceeds to step S502. Note that, in the present embodiment, an apparatus name, an IP address, and a Mac address of each image reading apparatus is obtained at the time of the search.

In step S502, the reading apparatus selection unit 401 displays a search result screen 800 shown in FIG. 8 on the touch screen display 208, as a selection screen on which any of the image reading apparatuses can be selected from the search result. In FIG. 8, a result in which two image reading apparatuses has been found is displayed.

Upon the user (operator) tapping an icon of any of the found image reading apparatuses, in step S503, the reading apparatus selection unit 401 determines that the image reading apparatus indicated by the icon tapped by the user is selected as the reading target apparatus, and stores information related to the reading target in the storage 207. Then, the processing ends.

Note that FIG. 9 shows an example of information 900 related to the reading target apparatus in the present embodiment. According to the present embodiment, the information 900 related to the reading target apparatus contains an apparatus name, an IP address, and a Mac address. In step S903, this information 900 is stored in the storage 207.

Reception Processing

Figure 6:
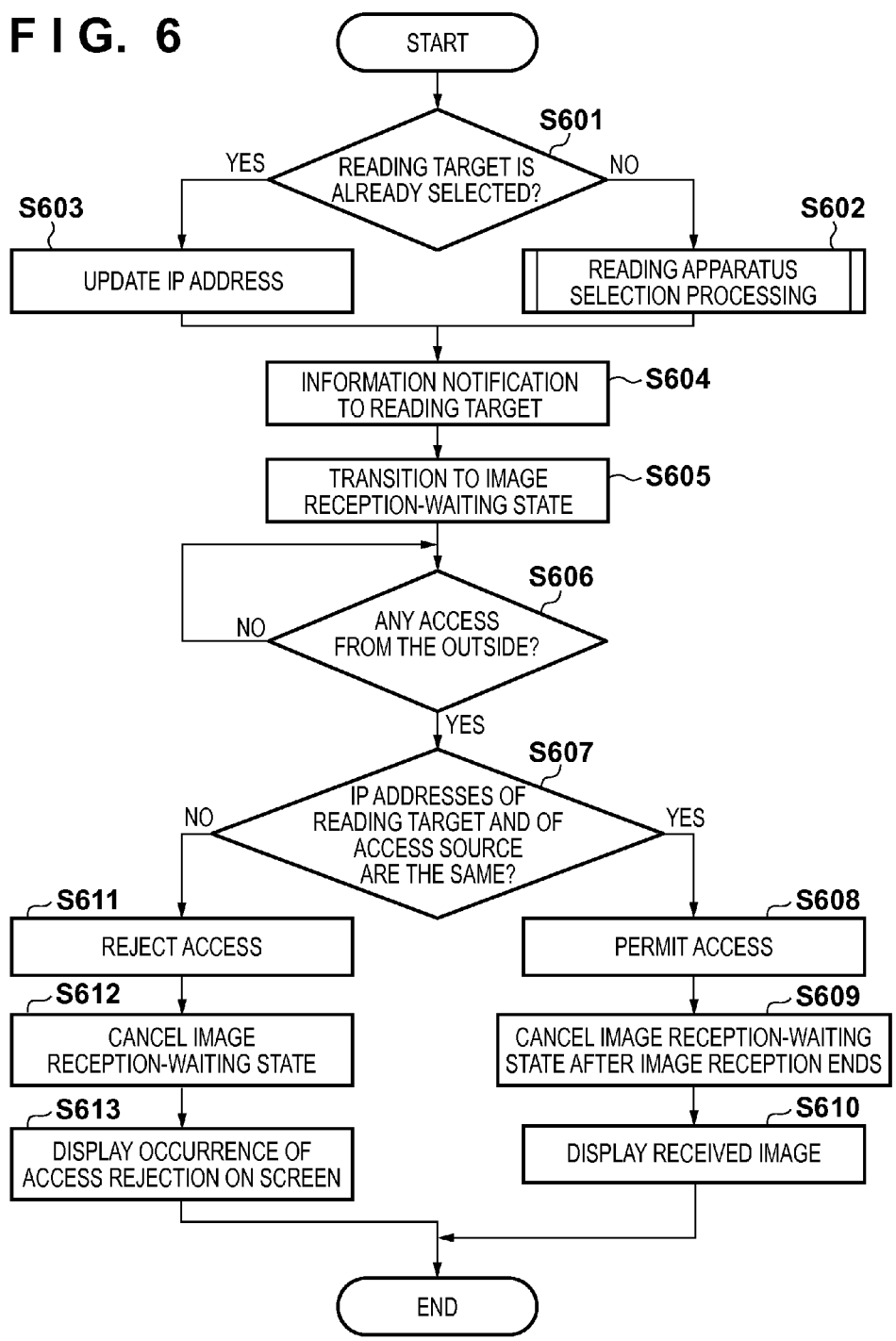
FIG. 6 is a flowchart showing processing by which the information processing apparatus 110 according to an embodiment receives an image.

Next, processing by which the information processing apparatus 110 receives an image in the present embodiment will be described with reference to FIG. 6. The processing described below is realized by the system control unit 201 executing a control program or the like stored in the storage 207. This processing is started by the user tapping an icon 702 for transitioning to the image reception-waiting state, from the initial screen 700 of the application 400 shown in FIG. 7.

In step S601, the reception-waiting processing unit 402 determines whether or not selection of the reading target apparatus in step S503 has finished. If finished, the processing proceeds to step S603, and if not, the processing proceeds to step S602. In step S602, the reception-waiting processing unit 402 executes the flowchart in FIG. 5 as processing for selecting an image reading apparatus. Then, the processing proceeds to step S604.

In step S603, the reception-waiting processing unit 402 obtains the current IP address (latest network information) from the Mac address of the reading target apparatus. The method for obtaining an IP address from a Mac address may be a unique protocol or a general means such as RARP, as mentioned in the description of the reception-waiting processing unit 402 in FIG. 4. The reception-waiting processing unit 402 writes (updates) the obtained IP address over the information (FIG. 9) related to the reading target stored in the storage 207, and the processing proceeds to step S604.

In step S604, the reception-waiting processing unit 402 gives an instruction to transmit the notification information to the information notification unit 403. The information notification unit 403 notifies the reading target apparatus of the information, and the processing proceeds to step S605. In the present embodiment, the reading target apparatus is notified of "transmission destination" information as the notification information. The "transmission destination" information is the IP address, e.g., "111.222.333.444", of the information processing apparatus 110 serving as an address to which the image data of the original read by the image reading apparatus is transmitted.

In step S605, the reception-waiting processing unit 402 transitions to the image reception-waiting state, and the processing proceeds to step S606. In the present embodiment, the reception-waiting processing unit 402 displays an image transmission destination notification screen shown in FIG. 10 on the touch screen display 208, and operates as a WebDAV server. In step S606, the reception-waiting processing unit 402 determines whether or not any access has been made from an external apparatus. If there has been access, the processing proceeds to step S607, and if not, the processing in step S606 is periodically repeated.

In step S607, the reception-waiting processing unit 402 compares the IP address of the reading target apparatus in FIG. 9 with the IP address of the external apparatus that had made access. As a result of the comparison, if the IP addresses are the same, the processing proceeds to step S608, and if not, the processing proceeds to step S611.

In step S608, the reception-waiting processing unit 402 permits the access from the external apparatus and accepts image reception. Then, the processing proceeds to step S609. In step S609, the reception-waiting processing unit 402 waits until image reception ends, and upon the reception ending, the reception-waiting processing unit 402 cancels the image reception-waiting state. Then, the processing proceeds to step S610. In the present embodiment, the reception-waiting processing unit 402 stops the operation for serving as a WebDAV server. In step S610, the reception-waiting processing unit 402 displays the received image on the touch screen display 208 as shown in FIG. 11, and ends the processing.

On the other hand, in step S611, the reception-waiting processing unit 402 rejects the access from the external apparatus, and the processing proceeds to step S612. In step S612, the reception-waiting processing unit 402 cancels the image reception-waiting state, and the processing proceeds to step S613. In step S613, the reception-waiting processing unit 402 displays, on the touch screen display 208, an unauthorized access occurrence notification screen for notifying the user that unauthorized access has occurred, as shown in FIG. 12, and the processing ends. For example, as shown in FIG. 12, a message that unauthorized access has occurred is displayed.

Storing Processing

Figure 13:
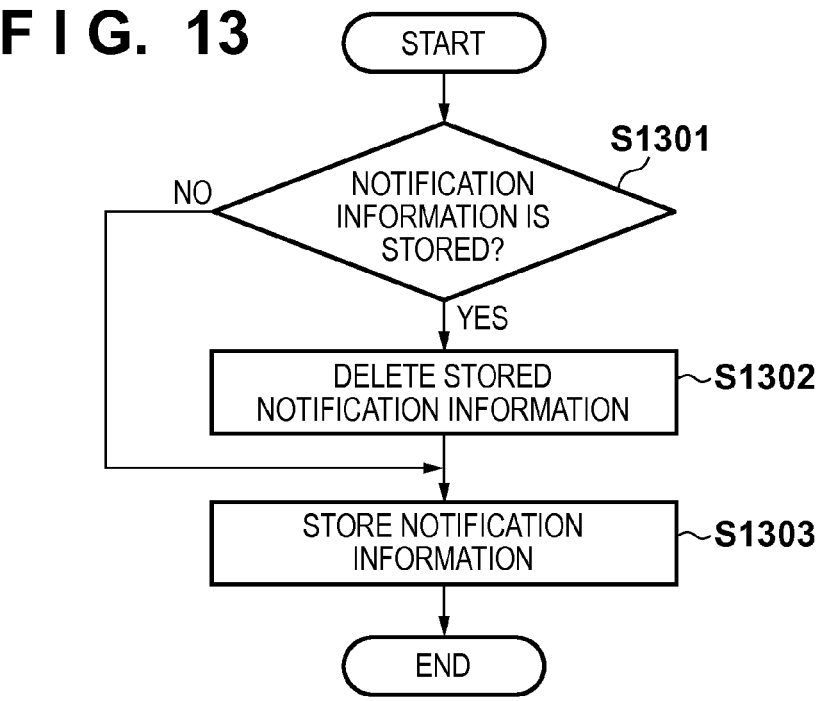
FIG. 13 is a flowchart showing processing of the image reading apparatus 130 for storing notification information according to an embodiment.

Next, processing of the image reading apparatus 130 for storing the notification information in the present embodiment will be described with reference to FIG. 13. The processing described below is realized by the system control unit 301 executing a control program or the like stored in the ROM 302. This processing is started by the information notification unit 403 in the information processing apparatus 110 notifying the reading setting unit 412 of the information.

In step S1301, the reading setting unit 412 determines whether or not the notification information is already stored in the RAM 303 or the external storage device 309. If already stored, the processing proceeds to step S1302, and if not, the processing proceeds to step S1303. That is to say, here, old information is deleted, and new information of which the image reading apparatus 130 is notified is stored as the transmission destination of read image data. In step S1302, the reading setting unit 412 deletes the stored information, and the processing proceeds to step S1303. In step S1303, the reading setting unit 412 stores, as a setting item related to image reading, the information of which the image reading apparatus 130 is notified, and the processing ends. Note that, in the present embodiment, the information of which the image reading apparatus 130 is notified is "transmission destination" information, which is the IP address, e.g., "111.222.333.444", of the information processing apparatus 110. Accordingly, the reading setting unit 412 stores the "transmission destination" information of which the image reading apparatus 130 is notified, as the transmission destination to which the read image data is to be transmitted after image reading is carried out.

Input Processing

Figure 14:
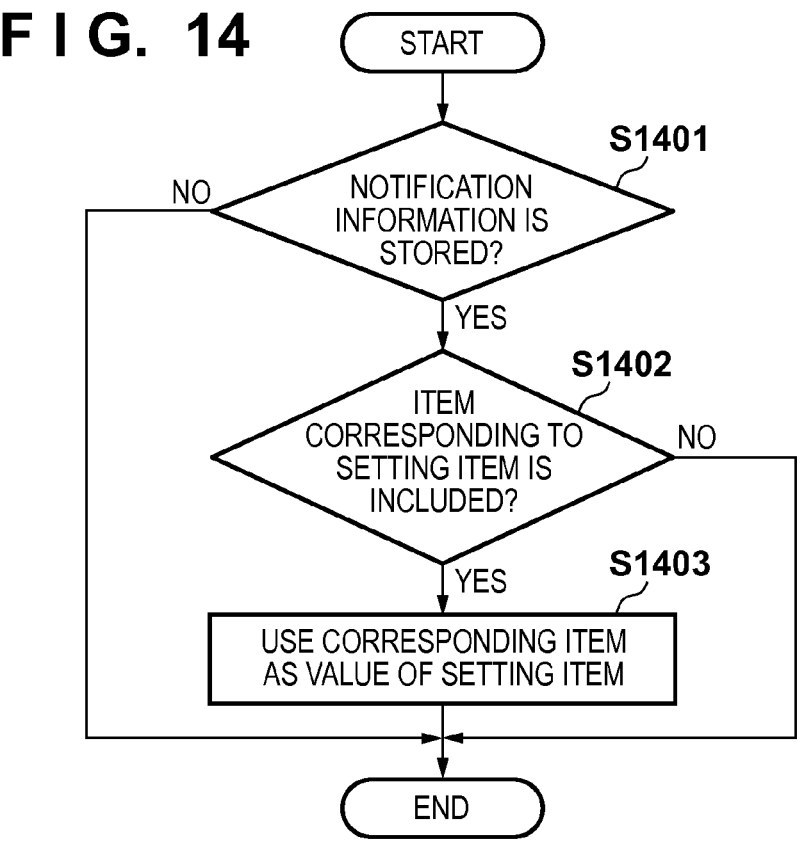
FIG. 14 is a flowchart showing processing for inputting the notification information as a setting item related to image reading of the image reading apparatus 130 according to an embodiment.

Next, processing for inputting the notification information as the setting item related to image reading by the image reading apparatus 130 in the present embodiment will be described with reference to FIG. 14. The processing described below is realized by the system control unit 301 executing a control program or the like stored in the ROM 302. This processing is started when the reading setting unit 412 configures settings related to image reading, using the display unit 306. Note that the method for displaying the setting screen will not be described since it depends on UI specifications of each image reading apparatus and is irrelevant to the essence of the present invention.

Figure 15:
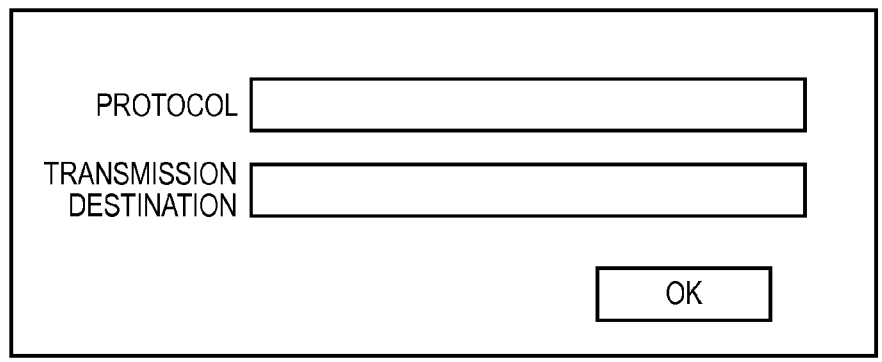
FIG. 15 is a diagram showing an example of a transmission destination setting screen of a reading setting unit 412 of the image reading apparatus 130 according to an embodiment.

In step S1401, the reading processing unit 411 determines whether or not the notification information is stored in the RAM 303 or the external storage device 309. If stored, the processing proceeds to step S1402, and if not, the processing ends. In step S1402, the reading processing unit 411 reads out the stored notification information, and determines whether or not the stored notification information includes an item corresponding to the setting item related to image reading. If a corresponding item is included, the processing proceeds to step S1403, and if not, the processing ends. For example, in the present embodiment, a "transmission destination" item in the image transmission destination setting screen shown in FIG. 15 is included as one setting item related to image reading. If the notification information transmitted by the information notification unit 403 includes the "transmission destination" item, it is determined that "a corresponding item is included". Note that, although the description here is about a case where the "transmission destination" item is stored, the present invention is not limited thereto, and similar control is performed in a case where other items such as setting information of resolution or the like in image reading is stored.

In step S1403, the reading processing unit 411 causes the stored corresponding item to be reflected, as a value of the setting item including the corresponding information, in the setting screen, and displays it. Then, the processing ends. For example, if it is determined in step S1402 that an item corresponding to the "transmission destination" is included, the stored IP address such as "111.222.333.444" is used as the "transmission destination" item. For this reason, if the user causes the setting screen in FIG. 15 to be displayed, the transmission destination item in FIG. 15 is in a state where the IP address held in the "transmission destination" item is automatically input therein.

Image Reading Processing

Figure 16:
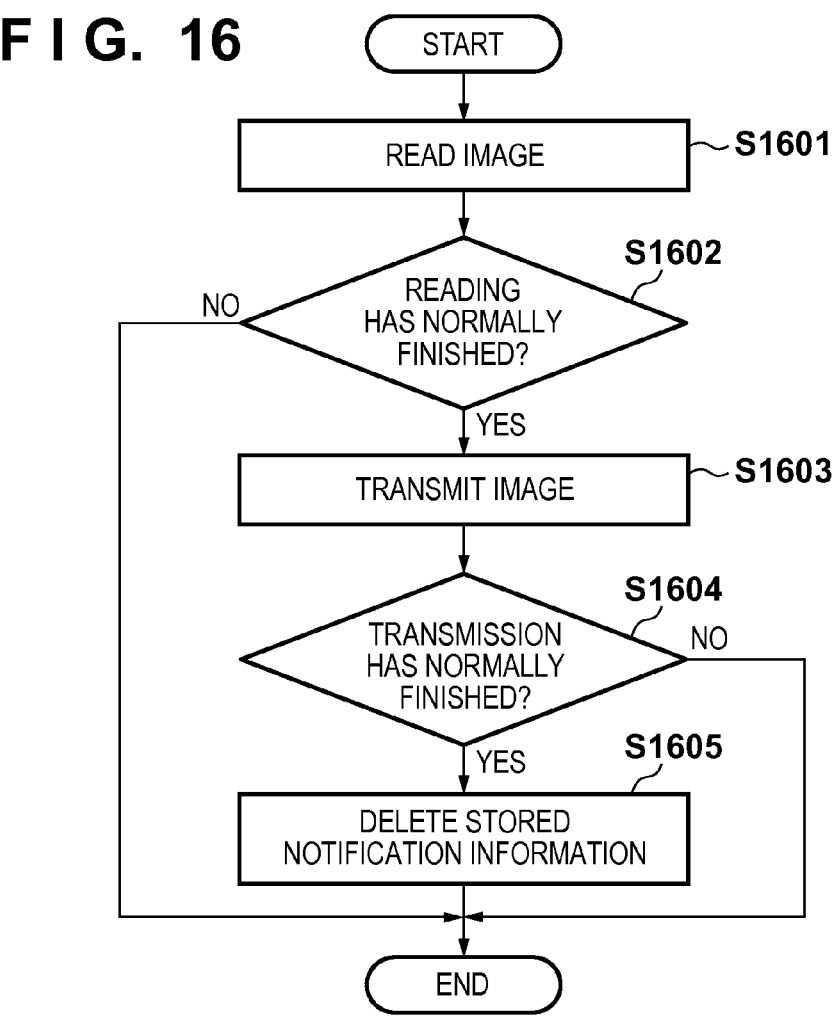
FIG. 16 is a flowchart showing image reading processing of the image reading apparatus 130 according to an embodiment.

Next, image reading processing of the image reading apparatus 130 in the present embodiment will be described with reference to FIG. 16. The processing described below is realized by the system control unit 301 executing a control program or the like stored in the ROM 302. This processing is started by the user accepting an image reading instruction and a transmission instruction via the operation unit 305, in a state where an original is set in the image reading apparatus 130 and necessary settings for image reading and transmission has been configured. Note that the method for giving the image reading instruction and the transmission instruction will not be described since it depends on UI specifications of each image reading apparatus and is irrelevant to the essence of the present invention.

In step S1601, the reading processing unit 411 reads an image using the scanner 304, in accordance with image reading settings. The reading processing will not be described since it is similar to general reading processing for PushScan and is irrelevant to the essence of the present invention. After finishing the image reading, the processing proceeds to step S1602.

In step S1602, the reading processing unit 411 determines whether or not image reading has normally finished. If normally finished, the processing proceeds to step S1603, and if image reading ends due to an error, this processing ends. In step S1603, the reading processing unit 411 transmits the normally read image in accordance with the transmission settings. The details of the transmission processing will not be described since it is similar to general transmission processing for PushScan and is irrelevant to the essence of the present invention. After finishing transmission, the processing proceeds to step S1604.

In step S1604, the reading processing unit 411 determines whether or not image transmission has normally finished. If normally finished, the processing proceeds to step S1605, and if image transmission ends due to an error, this processing ends. In step S1605, if the notification information such as information of the "transmission destination" is stored, the reading processing unit 411 deletes this information, and this processing ends.

As described above, in the present image reading system, the information processing apparatus notifies any of the image reading apparatuses on the network of the connection information, and permits transmission of image data only in a case where the image reading apparatus notified of the connection information accesses the information processing apparatus. The image reading apparatus transmits image data that is read from an original, to the transmission destination conforming to the connection information of which the image reading apparatus is notified by the information processing apparatus. In this manner, the information processing apparatus according to the present embodiment selects an image reading apparatus from which the information processing apparatus receives image data, notifies the selected image reading apparatus of the information of the information processing apparatus, receives image data only from the image reading apparatus notified of the information, and rejects access from other apparatuses. Note that the image reading apparatus stores the information of which the image reading apparatus is notified by the information processing apparatus, and when configuring image reading settings, the image reading apparatus causes the content of the stored information to be reflected in the setting screen and displays it, and it is thereby possible to suppress a workload on the user. Accordingly, according to the present embodiment, it is possible to prevent unauthorized access to the information processing apparatus, while suppressing a workload on the user during a series of image reading operations.

Note that the present invention is not limited to the above embodiment, and may be modified in various manners. For example, a plurality of items, such as "IP address, protocol, and image file format", may be transmitted, in place of the notification information, as the connection information. In this case, all items that are the corresponding items according to the determination in step S1402 are used as the items corresponding to the setting items in step S1403.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-243342 filed on Nov. 25, 2013, which is hereby incorporated by reference herein in its entirety.

What is claimed is:

1. An image reading system including an information processing apparatus and a plurality of image reading apparatuses for respectively reading an image from an original,
the information processing apparatus comprising:
a first controller; and
a first memory coupled to the first controller, the first memory having instructions stored thereon which, when executed by the first controller, cause the first controller to:
acquire an IP address for accessing an image reading apparatus when the image reading apparatus is selected by a user from the plurality of image reading apparatuses;
store the acquired IP address in the first memory;
notify the selected image reading apparatus, of connection information for accessing the information processing apparatus;
determine, when access is made from an image reading apparatus, whether or not an IP address of the image reading apparatus coincides with the IP address stored in the first memory; and
reject the access from the image reading apparatus if, as a result of the determination, the IP address of the image reading apparatus does not coincide with the IP address stored in the first memory, and permit the access from the image reading apparatus and receive image data therefrom if the IP address of the image reading apparatus coincides with the IP address stored in the first memory, and
the image reading apparatuses each comprising:
a second controller; and
a second memory coupled to the second controller, the second memory having instructions stored thereon which, when executed by the second controller, cause the second controller to:
store the connection information notified from the information processing apparatus, as a transmission destination;
configure a setting related to image reading; and
transmit, upon receiving an image reading instruction, the image data that is read from the original to the transmission destination based on the stored connection information.

2. The image reading system according to claim 1, wherein the second controller displays, on a display unit of the image reading apparatus, the setting screen in which the connection information stored in the second memory is reflected.

3. The image reading system according to claim 1, wherein the second controller is further configured to display, on a display unit of the information processing apparatus, a message that the access is rejected in a case of rejecting the access, and display, on the display unit of the information processing apparatus, a message that image data is being received in a case of permitting the access.

4. The image reading system according to claim 1, wherein the second controller is further configured to search for the plurality of image reading apparatuses connected via the network, display, on a display unit of the information processing apparatus, a selection screen on which selection can be made from among found image reading apparatuses, and select an image reading apparatus to be notified of the connection information from the information processing apparatus, in accordance with an operator's instruction that is input via the selection screen.

5. The image reading system according to claim 1, wherein, upon one of the image reading apparatuses being notified of the connection information from the information processing apparatus, the second controller deletes already-stored information from the second memory and thereafter stores the connection information in the second memory.

6. The image reading system according to claim 1, wherein, upon reception of image data by the first controller ending, the second controller further deletes the stored connection information from the second memory.

7. An information processing apparatus connected, via a network, to a plurality of image reading apparatuses for respectively reading an image from an original, the information processing apparatus comprising:
a first controller; and
a first memory coupled to the first controller, the first memory having instructions stored thereon which, when executed by the first controller, cause the first controller to:
acquire an IP address for accessing an image reading apparatus when the image reading apparatus is selected by a user from the plurality of image reading apparatuses;
store the acquired IP address in the first memory;
notify the selected image reading apparatus of connection information for accessing the information processing apparatus;

determine, when access is made from an image reading apparatus, whether or not an IP address of the image reading apparatus coincides with the IP address stored in the first memory; and reject the access from the image reading apparatus if, as a result of the determination, the IP address of the image reading apparatus does not coincide with the IP address stored in the first memory, and permit the access from the image reading apparatus and receive image data therefrom if the IP address of the image reading apparatus coincides with the IP address stored in the first memory.

8. A method for controlling an information processing apparatus connected, via a network, to a plurality of image reading apparatuses for reading an image from an original wherein the information processing apparatus comprises a first controller; and a first memory coupled to the first controller, the first memory unit having instructions executed by the first controller, the method comprising:

acquiring an IP address for accessing an image reading apparatus when the image reading apparatus is selected by a user and from the plurality of image reading apparatuses;

storing, in the first memory, the acquired IP address;

notifying the selected image reading apparatus, of connection information for accessing the information processing apparatus;

determining, when access is made from an image reading apparatus, whether or not an IP address of the image reading apparatus coincides with the IP address stored in the first memory; and rejecting the access from the image reading apparatus if, as a result of the determining, the IP address of the image reading apparatus does not coincide with the IP address stored in the first memory, and permitting the access from the image reading apparatus and receiving image data therefrom if the IP address of the image reading apparatus coincides with the IP address stored in the first memory.

9. A non-transitory computer-readable program for causing a computer to execute a method of controlling an information processing apparatus connected, via a network, to a plurality of image reading apparatuses for respectively reading an image from an original wherein the information processing apparatus comprises a first controller; and a first memory coupled to the first controller, the first memory unit having instructions executed by the first controller, the method comprising:

acquiring an IP address for accessing an image reading apparatus when the image reading apparatus is selected by a user from the plurality of image reading apparatuses;

storing, in the first memory, the acquired IP address;

notifying the selected image reading apparatus, of connection information for accessing the information processing apparatus;

determining, when access is made from an image reading apparatus, whether or not an IP address of the image reading apparatus coincides with the IP address stored in the first memory; and rejecting the access from the image reading apparatus if, as a result of the determining, the IP address of the image reading apparatus does not coincide with the IP address stored in the first memory, and permitting the access from the image reading apparatus and receiving image data therefrom if the IP address of the image reading apparatus coincides with the IP address stored in the first memory.

* * * * *